(12) United States Patent
Raveendran et al.

(10) Patent No.: US 11,228,754 B2
(45) Date of Patent: Jan. 18, 2022

(54) HYBRID GRAPHICS AND PIXEL DOMAIN ARCHITECTURE FOR 360 DEGREE VIDEO

(71) Applicant: QUALCOMM Incorporated, San Diego, CA (US)

(72) Inventors: Vijayalakshmi Rajasundaram Raveendran, Del Mar, CA (US); Mina Ayman Saleh Yanni Makar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 916 days.

(21) Appl. No.: 15/269,157

(22) Filed: Sep. 19, 2016

(65) Prior Publication Data

US 2017/0324951 A1 Nov. 9, 2017

Related U.S. Application Data

(60) Provisional application No. 62/332,918, filed on May 6, 2016.

(51) Int. Cl.
*H04N 19/597* (2014.01)
*G06T 3/00* (2006.01)
(Continued)

(52) U.S. Cl.
CPC ....... *H04N 13/351* (2018.05); *G02B 27/0093* (2013.01); *G02B 27/017* (2013.01);
(Continued)

(58) Field of Classification Search
CPC .. H04N 13/04; H04N 13/0447; H04N 19/597; G03B 37/00; G06F 3/048
(Continued)

(56) References Cited

U.S. PATENT DOCUMENTS

2003/0095131 A1* 5/2003 Rondinelli ............ G06T 3/0062
345/582
2014/0087867 A1 3/2014 Hightower
(Continued)

FOREIGN PATENT DOCUMENTS

CN 1625246 A 6/2005
JP 2016010021 A 1/2016
(Continued)

OTHER PUBLICATIONS

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
(Continued)

*Primary Examiner* — Amir Shahnami
(74) *Attorney, Agent, or Firm* — Campbell C. Chiang (57) ABSTRACT

In a method and apparatus for processing video data, one or more processors are configured to encode a portion of stored video data in a pixel domain to generate pixel domain video data, a first graphics processing unit is configured to process the video data in a graphics domain to generate graphics domain video data, and an interface transmits the graphics domain video data and the pixel domain video data. One or more processors are configured to parse the video data into a graphics stream and an audio-video stream and decode the video data, a sensor senses movement adaptations of a user, and a second graphics processing unit is configured to generate a canvas on a spherical surface with texture information received from the graphics stream, and render a field of view based on the sensed movement adaptations of the user.

23 Claims, 5 Drawing Sheets

(51) Int. Cl.
*H04N 13/351* (2018.01)
*H04N 13/344* (2018.01)
*H04N 13/366* (2018.01)
*H04N 19/70* (2014.01)
*G06T 9/00* (2006.01)
*G02B 27/01* (2006.01)
*G06F 3/01* (2006.01)
*G02B 27/00* (2006.01)
*H04N 5/232* (2006.01)

(52) U.S. Cl.
CPC ............ *G06F 3/012* (2013.01); *G06T 3/0043* (2013.01); *G06T 9/00* (2013.01); *H04N 13/344* (2018.05); *H04N 13/366* (2018.05); *H04N 19/597* (2014.11); *H04N 19/70* (2014.11); *G02B 2027/0187* (2013.01); *H04N 5/23238* (2013.01)

(58) Field of Classification Search
USPC .......................................................... 348/38
See application file for complete search history.

(56) References Cited

U.S. PATENT DOCUMENTS

| | | | |
|---|---|---|---|
| 2014/0098185 A1* | 4/2014 | Davari | H04N 5/23238 348/36 |
| 2014/0191990 A1 | 7/2014 | Marriott et al. | |
| 2015/0287240 A1 | 10/2015 | Janczak et al. | |
| 2015/0379730 A1 | 12/2015 | Tsakok et al. | |
| 2016/0012855 A1* | 1/2016 | Krishnan | G11B 27/105 386/241 |
| 2016/0048941 A1 | 2/2016 | Makar et al. | |
| 2016/0063964 A1 | 3/2016 | Verma et al. | |
| 2016/0104510 A1* | 4/2016 | Tamir | H04N 5/222 386/223 |
| 2016/0127443 A1 | 5/2016 | Makar et al. | |
| 2016/0241836 A1* | 8/2016 | Cole | H04N 19/597 |

FOREIGN PATENT DOCUMENTS

| | | |
|---|---|---|
| JP | 2016015705 A | 1/2016 |
| WO | 03027766 A2 | 4/2003 |
| WO | 03041011 A2 | 5/2003 |
| WO | 2014191990 A1 | 12/2014 |
| WO | WO-2015134400 A1 | 9/2015 |
| WO | WO-2016010668 A1 | 1/2016 |
| WO | WO-2016040161 A1 | 3/2016 |

OTHER PUBLICATIONS

International Search Report and Written Opinion—PCT/US2017/021914—ISA/EPO—dated Jun. 27, 2017 (22 pages).
Response to Written Opinion from corresponding PCT Application Serial No. PCT/US2017/021914 filed on Jan. 19, 2018, (21 pages).
Second Written Opinion from corresponding PCT Application Serial No. PCT/US2017/021914 dated Mar. 5, 2018, (19 pages).
International Preliminary Report on Patentability from corresponding PCT Application Serial No. PCT/US2017/021914 dated Jun. 7, 2018 (34 pp).
Ochi D., et al., "Live Streaming System for Omnidirectional Video", 2015 IEEE Virtual Reality (VR), Mar. 23, 2015 (Mar. 23, 2015), pp. 349-350.

* cited by examiner

HYBRID GRAPHICS AND PIXEL DOMAIN ARCHITECTURE FOR 360 DEGREE VIDEO

TECHNICAL FIELD

This application claims the benefit of U.S. Provisional Application Ser. No. 62/332,918, filed May 6, 2016, the entire content of each of which is incorporated herein by reference.

This disclosure relates to coding and transmission of 360 degree video.

BACKGROUND

As a result of recent 360 degree video technology, the video environment experienced by the user has become just as important as the subject of the videos themselves. Such 360 video technology may involve real-time streaming of 360 video graphics and/or real-time streaming of 360 video from a 360 degree video camera or website to a real-time video display, such as a virtual reality (VR) head-mount display (HMD). A VR HMD allows the user to experience action happening all around them by changing a viewing angle with a turn of the head. In order to create a 360 degree video, a special set of cameras may be used to record all 360 degrees of a scene simultaneously, or multiple views (e.g., video and/or computer-generated images) may be stitched together to form the image.

SUMMARY

In general, this disclosure describes techniques for streaming of 360 video data. In one example, this disclosure proposes a video encoder configured to encode a portion of the 360 video data in a pixel domain to generate pixel domain video data, a first graphics processing unit to process the 360 video data in a graphics domain to generate graphics domain video data, and an interface to transmit the graphics domain video data and the pixel domain video data for streaming the 360 video data.

In one example, this disclosure proposes an apparatus configured to process video data. A memory is configured to store the video data, one or more processors are configured to encode a portion of the stored video data in a pixel domain to generate pixel domain video data, and a first graphics processing unit is configured to process the video data in a graphics domain to generate graphics domain video data. An interface is configured to transmit the graphics domain video data and the pixel domain video data as a video stream.

In another example, the disclosure further proposes an apparatus configured to process video data. A memory is configured to store a video stream comprising pixel domain video data and graphics domain video data, and one or more processors are configured to parse the stored video stream into a graphics stream and an audio-video stream and decode the video stream. A sensor senses movement adaptations of a user, and a graphics processing unit is configured to generate a canvas on a spherical surface with texture information from the graphics stream, and render a field of view based on the sensed movement adaptations of the user.

In another example, a method of processing video data comprises storing the video data, encoding a portion of the video data in a pixel domain to generate pixel domain video data, processing the video data in a graphics domain to generate graphics domain video data, and transmitting the graphics domain video data and the pixel domain video data. In another example, a method of processing a video data comprises storing a video stream comprising pixel domain video data and graphics domain video data, parsing the stored video stream into a graphics stream and an audio-video stream and decoding the video stream, sensing movement adaptations of a user, generating a canvas on a spherical surface with texture information from the graphics stream, and rendering a field of view based on the sensed movement adaptations of the user.

In one example, this disclosure proposes a method of streaming of 360 video data, the method comprising streaming the 360 video data in a graphics domain, encoding at least one portion of the 360 video data in a pixel domain, and transmitting the streamed 360 video data in the graphics domain and the at least one portion of the 360 video data in the pixel domain.

In another example, the disclosure further proposes extracting sensor data, and processing the extracted sensor data to determine movement adaptations of a user. In another example, the disclosure further proposes that streaming the 360 video data in a graphics domain comprises converting the 360 video data in the graphics domain to a texture for execution by a graphics processor for rendering of the 360 video data inside a sphere, applying timestamps for synchronization, and real-time protocol encapsulating the video data for transport. In another example, the disclosure further proposes that streaming at least a portion of the 360 video data in the pixel domain comprises mapping the 360 video data to one of cube map, equirectangular and pyramid projection, encoding the at least one portion of the 360 video data to a plurality of tiles at various resolutions, and streaming a portion of the plurality of tiles based on determined movement adaptations of a user.

In another example, the disclosure proposes receiving the streamed 360 video data, parsing the streamed 360 video data into a graphics stream and an audio-video stream, generating a canvas on a spherical surface, sensing movement of a user, and rendering a field of vision based on the generated canvas and the sensed movement. In another example, the disclosure proposes a source device comprising a processor configured to generate and stream the 360 video data in a graphics domain, generate and stream the 360 video data in a pixel domain, transmit the streamed 360 video data, a destination device to receive the transmitted streamed 360 video and comprising a processor configured to parse the streamed 360 video data into a graphics stream and an audio-video stream, generate a canvas on a spherical surface, sense movement of a user, and render a field of vision based on the generated canvas and the sensed movement.

In another example, the disclosure proposes converting the 360 video data in the graphics domain to a texture for execution by a graphics processor for rendering of the 360 video data inside a sphere, applying timestamps for synchronization, and real-time protocol encapsulating the video data for transport.

In another example, the disclosure further proposes a non-transitory computer-readable storage medium storing instructions that, when executed, cause one or more processors to perform a method, the method comprising any combination of the methods of streaming of 360 video data.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

Streaming of data related to video beneficially occurs quickly in order to avoid the effect of a lag time experienced by the user during changes in a field of view (FoV), without compromising video quality or resolution. In particular, a pure pixel domain architecture (e.g., an architecture consisting only of video encoding/decoding techniques) for 360 video may impose a latency penalty due to the required encoding and decoding overhead, while a pure graphics domain architecture may have a prohibitively high texture overhead if the entire 360 degree video is desired to be transmitted (e.g., transmitted wirelessly in real-time).

This disclosure describes techniques for a streaming video system for video data that utilizes a hybrid graphics and pixel domain approach where baseline quality and immediate responsiveness is provided by a graphics domain pipeline, and high resolution video is provided by a pixel domain pipeline. In addition, the streaming video system also addresses head movement adaptations for VR HMD applications for directional audio and video synchronization. As a result, the techniques and devices described in the present disclosure leverage the strengths of pixel and graphics domain streaming for real-time applications and takes into account the human visual field characteristics in conjunction with window of visibility constraints.

Figure 1:
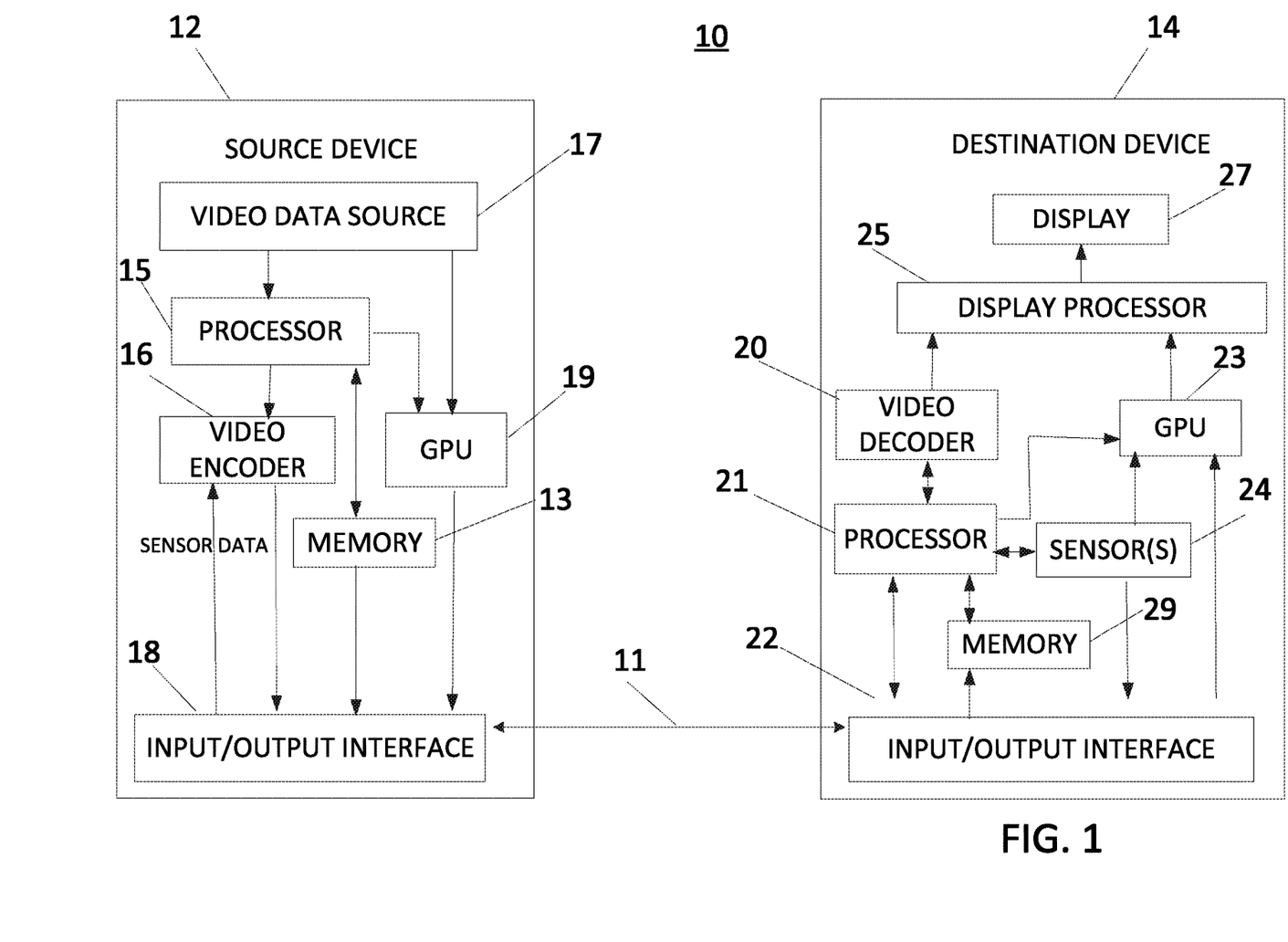
FIG. 1 is a block diagram of an apparatus for processing video data that may utilize one or more techniques described in this disclosure.

FIG. 1 is a block diagram of an apparatus for processing video data that may utilize one or more techniques described in this disclosure. As shown in FIG. 1, a system 10 for streaming video includes a video source device 12 that provides encoded video data to be decoded at a later time by a destination device 14. In particular, source device 12 provides the video data to destination device 14 via a computer-readable medium 11. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication. In one example, destination device 14 may be a virtual reality (VR) head mounted display (HMD), and video source device 12 may generate and stream 360 video to destination device.

Destination device 14 may receive the encoded video data to be decoded via computer-readable medium 11 and store the encoded video data in a memory 29. Computer-readable medium 11 may comprise any type of medium or device capable of moving the encoded video data from source device 12 to destination device 14. In one example, computer-readable medium 11 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

As illustrated in the example system 10 of FIG. 1, video source device 12 includes a video encoder 16 that encodes video data, such as 360 video data, from a video data source 17 using a combined graphics domain and pixel domain technique of the present disclosure, as described below in detail, and transmits the encoded video via a transmission input/output interface 18. In examples that include one or more sensors 24 positioned along destination device 14, video encoder 16 may receive sensor data from the destination device 14 via input/output interface 18 in order to determine movement of a user, as described below. The video data is also received from video source 17 by a graphics processing unit (GPU) 19, which transmits processed video data to input/output interface 18. In addition, a processor 15 receives the video data the video data from video source 17 and processes the video data for use by video encoder 16 and/or GPU 19. Source device 17 may include a microphone (not shown) capable of encoding surround sound audio.

Destination device 14 includes a video decoder 20 and a graphics processing unit (GPU) 23. The encoded video data may be transmitted wirelessly from the video source device 12 and received at destination device 14 via a transmission input/output interface 22, and processed by a processor 21. The resulting processed video data is then decoded by decoder 20, and/or utilized by a graphics processing unit (GPU) 23 to generate or render a field of vision (FoV) via a display processor 25 and display 27, as described below in detail. If destination device 14 is a virtual reality (VR) head mounted display (HMD), for example, one or more sensors 24 may also be included, such as one or more motion sensors, to sense the orientation and movement of the user. Display processor 25 receives decoded video data from the video decoder 20, along with the rendered field of vision from GPU 23, and processes the received data so as to enable the 360 video to be generated for viewing by a user on a display 27 of destination device 14.

The illustrated system 10 of FIG. 1 is merely one example. Techniques for coding and transmission of video data according to the techniques of this disclosure may be performed by any digital video encoding and/or decoding device. Although generally the techniques of this disclosure are performed by a video encoding or decoding device, the techniques may also be performed by a video codec. Moreover, the techniques of this disclosure may also be performed by a video processor. Source device 12 and destination device 14 are merely examples of such coding devices in which source device 12 generates coded video data for transmission to destination device 14.

Video data source 17 of source device 12 may include a video capture device, such as a 360 degree video camera system, a video camera, a video archive containing previously captured video, and/or a video feed interface to receive video from a video content provider. As a further example, video data source 17 may generate computer graphics-based data as the source video, or a combination of live video, archived video, and computer-generated video. In some cases, if video data source 17 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 16. The encoded video information may then be output by output interface 18 onto a computer-readable medium 11.

Computer-readable medium 11 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 11 may be understood to include one or more computer-readable media of various forms, in various examples.

Input interface 22 of destination device 14 receives information from computer-readable medium 11. The information of computer-readable medium 11 may include syntax information defined by video encoder 16, which is also used by video decoder 20, that includes syntax elements that describe characteristics and/or processing of blocks and other coded units. Display device 27 displays the decoded video data to a user, and may comprise any of a variety of display devices such as a 360 degree video display and a VR HMD, a cathode ray tube (CRT), a liquid crystal display (LCD), a plasma display, an organic light emitting diode (OLED) display, or another type of display device.

Video encoder 16 and video decoder 20 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 16 and video decoder 20 may be included in one or more encoders or decoders, either of which may be integrated as part of a combined video encoder/decoder (codec). A device including video encoder 16 and/or video decoder 20 may comprise an integrated circuit, a microprocessor, and/or a wireless communication device, such as a cellular telephone.

Display processor 25 may be a processor configured to perform 2D operations on image data, such as up-sampling, down-sampling, blending, compositing, scaling, rotation, and other pixel processing. Display processor 25 may also be configured to drive display 27. Display processor 25 pre-fetch or fetch multiple image layers (e.g., pixel domain video data and graphics domain video data) from memory 29 (e.g., a frame buffer to which a GPU outputs graphical data in the form of pixel representations and/or other memory) and composite such layers into a single image for display. Display processor 25 may process pixels from multiple layers. For example, display processor 25 may blend pixels from multiple layers, and write back the blended pixels into memory in tile format. Then, the blended pixels are read from memory in raster format and sent to display 27 for presentment.

Video encoder 16 and video decoder 20 may operate according to a video compression standard, such as the H.264/AVC or HEVC standard. However, the techniques of this disclosure are not limited to any particular coding standard, and any video coding techniques may be used.

In HEVC, a video picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive coding tree units (CTUs). Each of the CTUs may comprise a coding tree block of luma samples, two corresponding coding tree blocks of chroma samples, and syntax structures used to code the samples of the coding tree blocks. In a monochrome picture or a picture that have three separate color planes, a CTU may comprise a single coding tree block and syntax structures used to code the samples of the coding tree block.

A video picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs. A CU may comprise a coding block of luma samples and two corresponding coding blocks of chroma samples of a picture that has a luma sample array, a Cb sample array and a Cr sample array, and syntax structures used to code the samples of the coding blocks. In a monochrome picture or a picture that have three separate color planes, a CU may comprise a single coding block and syntax structures used to code the samples of the coding block. A coding block is an N×N block of samples.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs.

In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. A prediction block may be a rectangular (i.e., square or non-square) block of samples on which the same prediction is applied. A PU of a CU may comprise a prediction block of luma samples, two corresponding prediction blocks of chroma samples of a picture, and syntax structures used to predict the prediction block samples. In a monochrome picture or a picture that have three separate color planes, a PU may comprise a single prediction block and syntax structures used to predict the prediction block samples.

TUs may include coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU. A transform block may be a rectangular block of samples on which the same transform is applied. A transform unit (TU) of a CU may comprise a transform block of luma samples, two corresponding transform blocks of chroma samples, and syntax structures used to transform the transform block samples. In a monochrome picture or a picture that have three separate color planes, a TU may comprise a single transform block and syntax structures used to transform the transform block samples.

Following transformation, video encoder 16 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Video encoder 16 may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 16 may utilize a predefined scan order to scan the quantized transform coefficients to produce a serialized vector that can be entropy encoded. In other examples, video encoder 16 may perform an adaptive scan.

After scanning the quantized transform coefficients to form a one-dimensional vector, video encoder 16 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 16 may also entropy encode syntax elements associated with the encoded video data for use by video decoder 20 in decoding the video data.

Video encoder 16 may further send syntax data, such as block-based syntax data, picture-based syntax data, and group of pictures (GOP)-based syntax data, to video decoder 20, e.g., in a picture header, a block header, a slice header, or a GOP header. The GOP syntax data may describe a number of pictures in the respective GOP, and the picture syntax data may indicate an encoding/prediction mode used to encode the corresponding picture.

Video decoder 20, upon obtaining the coded video data, may perform a decoding pass generally reciprocal to the encoding pass described with respect to video encoder 16. For example, video decoder 20 may obtain an encoded video bitstream that represents video blocks of an encoded video slice and associated syntax elements from video encoder 16. Video decoder 20 may reconstruct the original, unencoded video sequence using the data contained in the bitstream.

In HEVC, for each block, a set of motion information may be available. A set of motion information contains motion information for forward and backward prediction directions. As described herein, forward and backward prediction directions are two prediction directions of a bi-directional prediction mode, and the terms "forward" and "backward" do not necessarily imply geometric directions. Instead, as used herein, "forward" and "backward" correspond to reference picture list 0 (RefPicList0) and reference picture list 1 (RefPicList1), respectively, for a current picture. In cases where only one reference picture list is available for a picture or slice, video encoder 16 and/or video decoder 20 may determine that only RefPicList0. Thus, in cases where only one reference picture list is available for a current picture or slice, video encoder 16 and/or video decoder 20 may determine that the motion information of each block of the current picture/slice is always "forward."

For each prediction direction, the motion information includes a reference index and a motion vector. In some cases, for simplicity, video encoder 16 may encode a motion vector such that the motion vector itself may be referred in a way that it is assumed that it has an associated reference index. For instance, video decoder 20 may reconstruct the motion vector and, based on the motion vector, video decoder 20 may associate a particular reference index with the motion vector. More specifically, video encoder 16 and/or video decoder 20 may use a reference index to identify a particular reference picture in the current reference picture list (e.g., RefPicList0 or RefPicList1) with respect to the corresponding motion vector. A motion vector has a horizontal component and a vertical component.

A picture order count (POC) is widely used in video coding standards to identify a display order of a picture. Although, in some instances, video encoder 16 may encode two pictures within one coded video sequence to have the same POC value, typically, a single coded video sequence may not include multiple pictures with the same POC value. In instances where multiple coded video sequences are present in a bitstream, pictures with a same POC value (but in different video sequences) may be relatively close to each other in terms of decoding order. Video encoder 16 and/or video decoder 20 may typically use POC values of pictures for reference picture list construction, derivation of reference picture set as in HEVC, and motion vector scaling.

Figure 2:
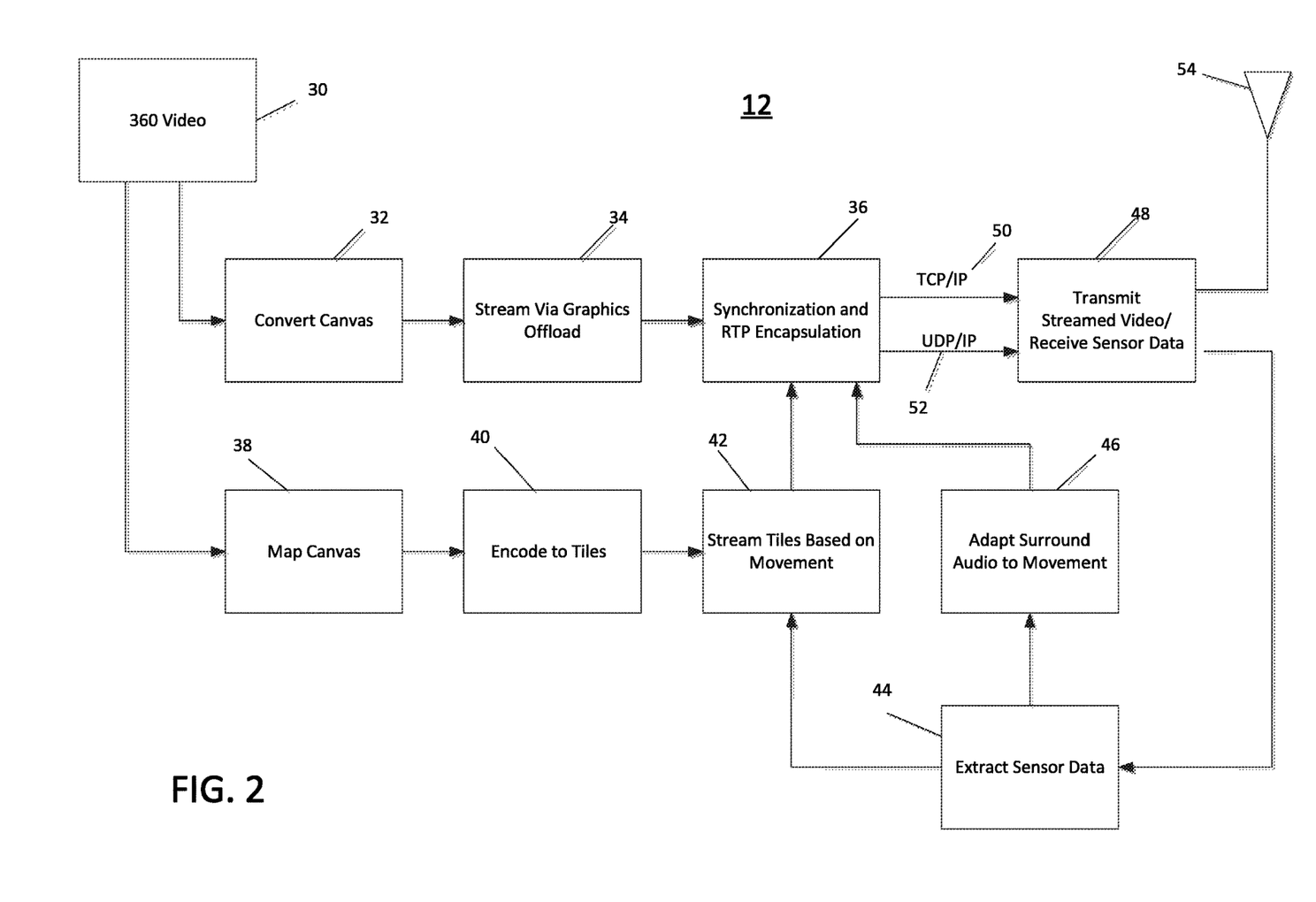
FIG. 2 is a block diagram illustrating an example source device that may implement one or more techniques described in this disclosure.

FIG. 2 is a block diagram illustrating an example 360 video encoder that may implement one or more techniques described in this disclosure. As shown in FIG. 2, the video data, such as may be captured by a 360 video camera system, is stitched together in by processor 15 to form an equirectangular canvas (30). Processor 15 converts the canvas to texture (32) for execution by a graphics processor (e.g., GPU 19 of FIG. 1), such as OpenGL VR application for rendering of the 360 video texture inside a sphere (32). The texture conversion by GPU 19 in block 32, which could include either low or high resolution video data, may be is updated every refresh period, such as every one second, for example. Streaming of the texture is performed via a graphics offload with scalable streaming function of GPU 19 of FIG. 1 (34), which may include lossless compression. GPU 19 may apply timestamps for synchronization and the streaming data is real time protocol (RTP) encapsulated for transport (36). The transmitted texture streamed by GPU 19 may be sent at a relatively low frame rate (e.g., 2 frames per second (fps)). In one example of the disclosure, the texture streamed by the GPU 19 allows the user of the display (e.g., a VR HMD) to have available the entirety of the 360 video image at a lower resolution. The FoV of video rendered using GPU 19 can be adapted in real-time since the adaptations are applied at the destination device 14 with local sensor data presenting user's head movements. In addition, there is no change in or refresh of the texture required corresponding to the change in FoV.

In addition to streaming of video data in the graphics domain by GPU 19 shown in blocks 32-36, the stitched video of block 30 is also encoded by video encoder 16 and transmitted in the pixel domain. The encoded video in the pixel domain may be sent at a higher frame rate (e.g., 60 fps) and at a higher resolution. In this way, moving objects in the 360 video may be encoded and rendered in more detail with better smoothness.

For example, the processor 15 may map the canvas to a cube map or pyramid projection (38), and video encoder 16 encodes the streaming video in tiles at various resolutions (40). Video encoder 16 may be configured to encode the tiles of video data of the stitched canvas using any video compression technique. For example, video encoder 16 may encode the tiles using a hybrid video encoder, such as H.264/AVC or H.265 (HEVC). Video encoder 16 may be configured to transmit a subset of the tiles based on sensed head movement of the user (42). The subset of tiles that are actually transmitted may be those tiles that are currently within a field of view (FoV) of a user. In order to stream the subset tiles based on head movement of the user (42), video encoder 16 also extracts sensor data from the one or more sensors 24 that detect the users head movement, and uses the sensed data to process movement of the user (44), to assist in the streaming of the subset tiles based on head movement of the user (42). In one example of the disclosure, the subset of tiles sent by source device 12 include high resolution tiles at the center of the FoV determined from the sensor data, and also sends low resolutions tiles, corresponding to the image in the peripheral visual region, that spatially surround the high resolution tiles. A user's eyes are likely to only sense the higher resolution at the center of the screen. Since the user's eyes are not focused on the tiles on the perimeter of the user's field of vision, there is no benefit to sending these tiles at higher resolutions. Thus, lower resolutions may be used, saving on bandwidth. This may make it easier to keep resolutions high at the center of the field of view while also maintaining a high frame rate. FoV adaptations for pixel domain data occur both at the source device 12 and the destination device 14 using sensor data corresponding to the user's head movement. At the source device 12, the resolution of the tiles to be used may be determined based on FoV adaptations, so that the highest quality (resolution) is at the center of FoV, with quality decreasing towards the periphery of FoV. The FoV adaptations at the source device 12 are large scale adaptations and may incur delays compared to the timing of the head movements at the destination device 14. At the destination device 14, FoV adaptations may include corrections associated with timing of head movements to address instances where a large shift in head movement occurs between the time the sensor data captured head movements and the time the sensor data associated with the captured head movements reached the source device 12.

In addition, the sensor data extracted and processed in block 44 may be utilized by video encoder 16 to adapt surround audio to the movement of the user, such as head movement, so as to synchronize the movement with the graphics background (46). For example, once video encoder 16 senses head movement of the user, the viewpoint of the display is changed accordingly by determining which pixels are within the viewpoint. In another embodiment, surround audio may be streamed in its entirety and direction audio may be enhanced based on head movement at the destination device 14, i.e., at the virtual reality (VR) head mounted display (HMD). Both of the streamed tiles (42), and the adaption of surround audio to the movement of the user, such as head movement (46), are included during the application of timestamps for synchronization and real time protocol (RTP) encapsulate for transport (36). For example, the graphics frames, encoded video frames (of tiles) and audio frames may be time stamped against the same reference clock, and the sampling rates for each may be different. However, the time stamps applied correspond to the image and audio at the time of capture from the 360 video source and surround audio source.

Video encoder 16 transmits the resulting timestamped streamed video from Block 36 via WiFi/WiGig, Block 48, using a transmission control protocol/internet protocol (TCP/IP) 50 or a user datagram protocol/internet protocol (UDP/IP) 52, via an antenna 54.

In this way, the streaming video system 10 utilizes a hybrid graphics and pixel domain approach where baseline quality and immediate responsiveness is provided by graphics domain pipeline, Blocks 32-36, and high resolution video is provided by the pixel domain pipeline, Blocks 38-46. In addition, the streaming video system 10 also addresses head movement adaptations and directional audio and video synchronization. As a result, the present disclosure leverages the strengths of pixel and graphics domain streaming for real-time applications and takes into account the human visual field characteristics in conjunction with window of visibility constraints. The benefits of the graphics domain portions is continuous baseline quality of video even with frequent head movement. The pixel domain overlay provides high quality frame rate and resolution for the current FoV.

Figure 3:
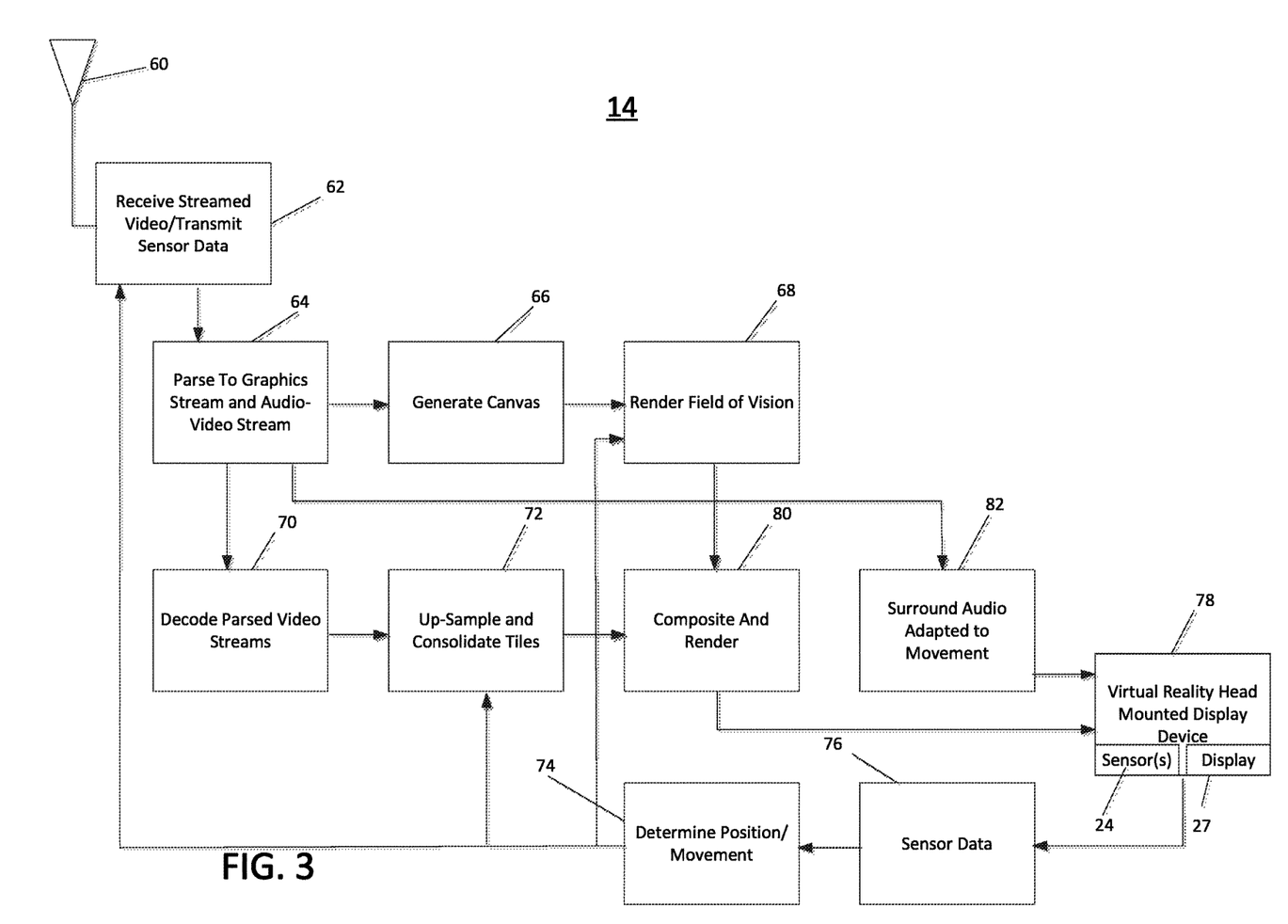
FIG. 3 is a block diagram illustrating an example device that may implement one or more techniques described in this disclosure.

FIG. 3 is a block diagram illustrating an example destination device 14 that may implement one or more techniques described in this disclosure. As shown in FIG. 3, the destination device 14 receives the resulting timestamped streamed video (36), wirelessly transmitted as described above from source device 12 via an antenna 60 and receives a WiFi/WiGig signal (62), using the transmission control protocol/internet protocol (TCP/IP) or the user datagram protocol/internet protocol (UDP/IP). Destination device 14 parses the received video stream into a graphics stream and an audio-video stream (64). GPU 23 generates or creates an entire canvas on a spherical surface (66) with the received texture information, and renders a field of vision (FoV), i.e., a viewpoint (68), based on the latest sensed head movement of the user received from the one or more sensors 24 (74).

In addition, video decoder 20 of destination device 14 decodes the parsed video streams (70), and up-samples and consolidates the received tiles for the field of vision (72). For example, destination device 14 may upsample any of the tiles sent in a lower resolution so that such tiles may be combined with the high resolution tiles to form a single image overlay. The tile organization (i.e., the FoV to be displayed) may be updated every refresh period, e.g., every one second. However, different refresh rates may be used. For example, the refresh rate may be dependent on processing power and power of service (QoS) on the transmission link. Refresh rates may vary from one second, one half second, to 100 milliseconds per frame, for example.

During up-sampling and consolidation of tiles for field of vision (72), destination device 14 determines head position and movement data (74) by intercepting sensor data and transport of a sensors framework (76), associated with a virtual reality (VR) head mounted display (HMD) device 78. In this way, predictive adaptations based on the latest head movement are utilized during both up-sampling and consolidation of tiles for field of vision (72), and during rendering of a field of view (68). In one example, the adaptations of image overlayed on baseline surface (i.e., the graphics domain textures) are based on the latest head movement. If the head movement would cause rendering of tiles so as to be out of the field of view based on the latest head movement, destination device 14 does not overlay those tiles. Adaptations may include extrapolating coded motion information based on head movement trajectories. In another example, the extent of head movement (degrees/sec, for example) may be tested against a window of visibility to ensure seamless transition of the image as a user moves his or her head.

In addition to being utilized during up-sampling (72), and rendering (68), the head position and movement sensor data, Block 74, is wirelessly transmitted for use by the encoder 12, as described above, via antenna 60. The up-sampled and consolidated tiles for field of vision, Block 72, and the rendered field of view, Block 68, are composited and rendered per presentation time stamps (80), so as to overlay high resolution video graphics with low resolution video graphics, and then output to the user by the virtual reality (VR) head mounted display (HMD) device 78 via display 27, along with surround audio via speakers (not shown) adapted to the latest head movement block 82 determined from the parse audio stream from block 64.

Figure 4:
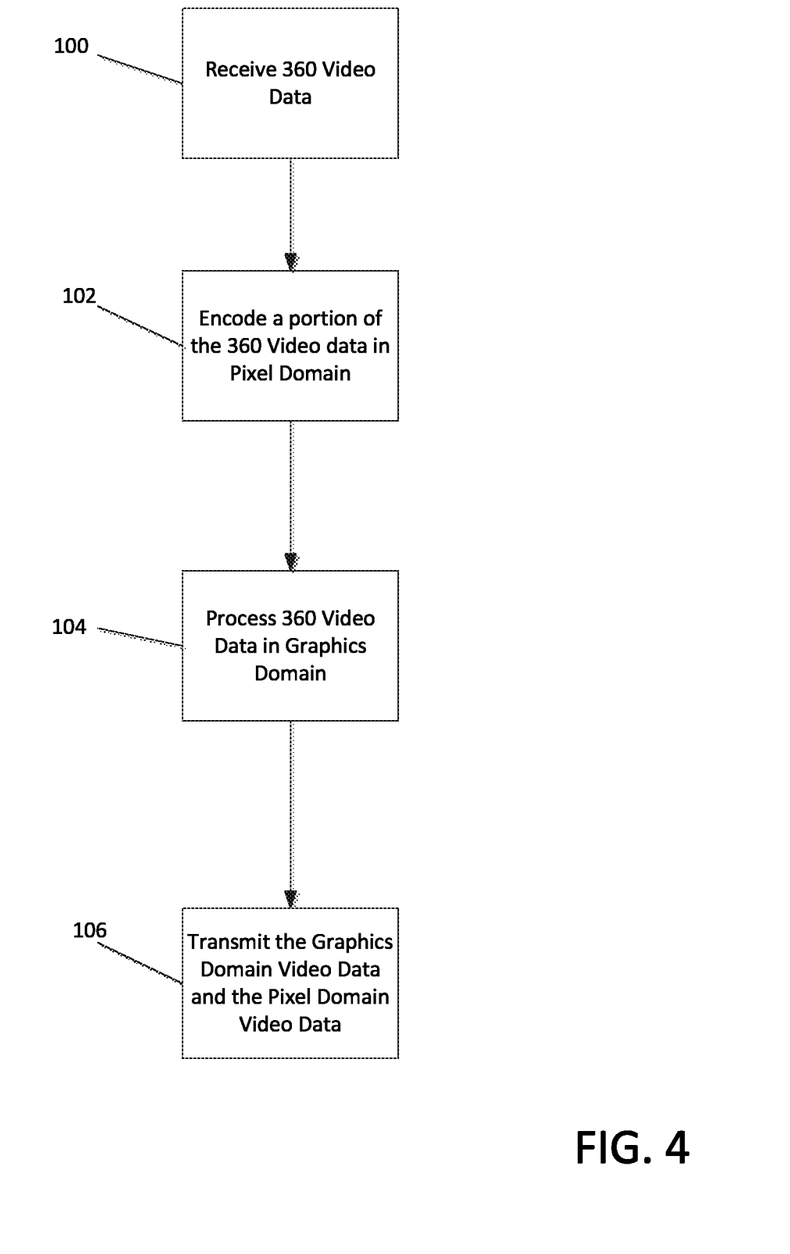
FIG. 4 is a flowchart of a method for processing video data according to an example of the present disclosure.

FIG. 4 is a flowchart of a method for processing video data according to an example of the present disclosure. As illustrate in FIG. 4, according to one example, the source device 12 receives video data (100) and one or more processors, 15 and 16 of the source device 12 are configured to encode a portion of the video data in a pixel domain to generate pixel domain video data (102). In addition, the graphics processing unit 19 of the source device 12 is configured to process the video data in a graphics domain to generate graphics domain video data (104). The graphics domain video data and the pixel domain video data is transmitted by interface 18 for streaming the video data (106).

During encoding to generate pixel data (102), the one or more processors 15 and 16 may stitch the 360 video data together to form an equirectangular canvas to generate graphics domain video data (104), the graphics processing unit 19 may convert the canvas to texture for rendering of the texture inside a sphere. In one example, a projection other than equirectangular projection may be used. For example, cubic projection or pyramidal projection may be used throughout the entire processing pipeline with appropriate transformations.

The texture may be transmitted via the interface 18 (106) at a first frame rate and the pixel domain video data is transmitted at the interface 18 (106) at a second frame rate greater than the first frame rate. According to one example, the texture may be transmitted via the interface 18 (106) at a first resolution and the pixel domain video data may be transmitted via the interface (106) at a second resolution greater than the first resolution. According to one example, during encoding to generate pixel data (102), the one or more processors 15 and 16 may map the canvas to one of a cube map or a pyramid projection, encode the streaming video to a plurality of tiles at a plurality of resolutions, and transmit (106) one or more tiles of the plurality of tiles that are within a field of view of a user. According to one example, the one or more processors 15 and 16 are configured to determine movement adaptations of the user and to determine the field of view based on the determined movement adaptations of the user. According to one example, the one or more processors 15 and 16 are configured to determine movement adaptations of the user, determine the field of view based on the determined movement adaptations of the user, and adapt surround sound video based on the determined field of view. According to one example, the one or more processors 15 and 16 are configured to transmit tiles in a center of the field of view at a first resolution based on the movement adaptations and transmit tiles within the field of view, but not in the center of the field of view, at a second resolution less than the first resolution.

Figure 5:
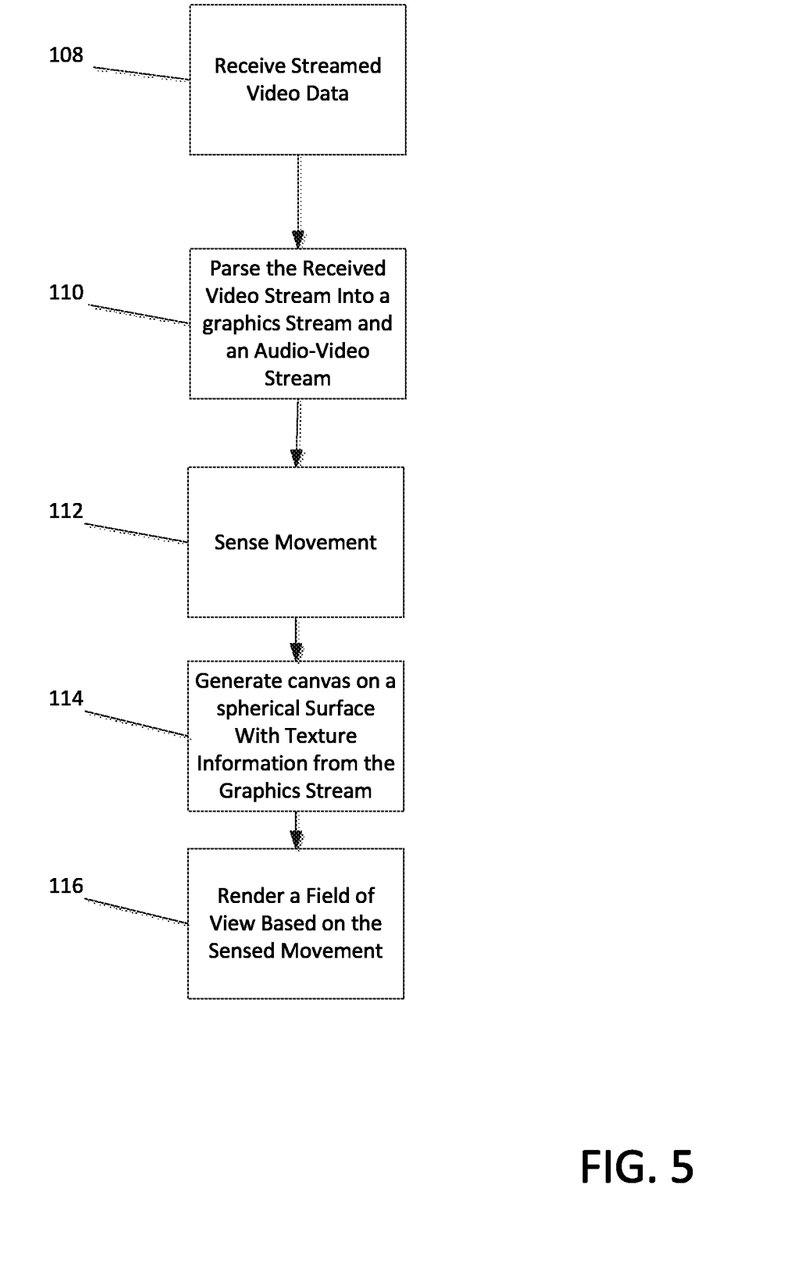
FIG. 5 is a flowchart of a method for processing video data according to an example of the present disclosure.

FIG. 5 is a flowchart of a method of processing video data according to an example of the present disclosure. As illustrated in FIG. 5, according to one example, destination device 14 receives the streamed video from video decoder 20 and stores the streamed video in memory 29(108), one or more processors 20 and 21 parse the received video stream into a graphics stream and an audio-video stream and decodes the parsed video stream (110). One or more sensors 24 of the destination device 14 senses movement adaptations of a user (112) and graphics processing unit 19 generates a canvas on a spherical surface with texture information from the graphics stream (114), and renders a field of view based on the sensed movement adaptations of the user (116).

According to one example, the one or more processors 20 and 21 may decode a plurality of tiles that are within the field of view of the user, upsample both tiles of the plurality of tiles that are low resolution tiles and tiles of the plurality of tiles that are high resolution tiles, and combine the low resolution tiles and the high resolution tiles to form a single image overlay. According to one example, the single image overlay may be formed based on the sensed movement adaptations of the user sensed via the one or more sensors 24. According to one example, the one or more processors 20 and 21 may determine whether the sensed movement adaptations of the user causes the upsampled tiles to be outside the field of view, and does not form the single image overlay based on determining that the sensed movement adaptations of the user causes the upsampled tiles to be outside the field of view.

According to one example, the sensed movement adaptations of the user (112) may include head movement trajectories. According to one example, the extent of head movement of the user may be compared to a window of visibility, and a determination may be made as to whether the sensed movement of the user causes the upsampled tiles to be outside the field of view and if so the video decoder does not form the single image overlay.

In this way, according to one example of the present disclosure, the video streaming system 10 utilizes the above described techniques to stream 360 degree video. The streaming video system 10 utilizes a hybrid graphics and pixel domain approach where baseline quality and immediate responsiveness is provided by a graphics domain pipeline, and high resolution textures are provided by a pixel domain pipeline. In addition, the streaming video system 10 also addresses head movement adaptations and direction audio and video synchronization. As a result, the present disclosure leverages the strengths of pixel and graphics domain streaming for real-time applications and takes into account the human visual field characteristics in conjunction with window of visibility constraints.

According to one example, the disclosure proposes coding the 360 video data in a graphics domain to create graphics domain video data; encoding the 360 video data in a pixel domain to create pixel domain video data, and transmitting the graphics domain and pixel domain video data.

In another example, the disclosure further discloses extracting sensor data, processing the extracted sensor data to determine movement adaptations of a user, and transmitting a subset of tiles of the pixel domain video data based on the extracted sensor. In another example, the disclosure further discloses converting the 360 video data in the graphics domain to a texture for execution by a graphics processor for rendering of the 360 video data inside a sphere, applying timestamps for synchronization, and real-time protocol encapsulating the video data for transport. In another example, the disclosure further discloses mapping the 360 video data to one of cube map and pyramid projection, encoding the 360 video data to a plurality of tiles at various resolutions, and streaming a subset of the plurality of tiles based on determined movement adaptations of a user. In another example, the disclosure further discloses adapting surround audio to determined movement adaptations of a user and synchronizing the determined movement with graphics background, and utilizing the streamed predetermined tiles of the plurality of tiles and the adapted surround audio during the application of timestamps for synchronization and the real-time protocol encapsulating the video data for transport.

In another example, the disclosure further discloses coding the 360 video data in a graphics domain to create graphics domain video data, coding the 360 video data in a pixel domain to create pixel domain video data, transmitting the graphics domain and pixel domain video data, receiving and parsing the transmitted graphics domain and pixel domain video data into a graphics stream and an audio-video stream, generating a canvas on a spherical surface, sensing movement of a user, and rendering a field of vision based on the generated canvas and the sensed movement.

In another example, the disclosure discloses a streaming 360 video system, comprising a source device comprising a source processor configured to code the 360 video data in a graphics domain to create graphics domain video data, code the 360 video data in a pixel domain to create pixel domain video data, and transmit the graphics domain and pixel domain video data, and a destination device to receive the transmitted graphics domain and pixel domain video data and comprising a destination processor configured to parse the transmitted graphics domain and pixel domain video data into a graphics stream and an audio-video stream, generate a canvas on a spherical surface, sense movement of a user, and render a field of vision based on the generated canvas and the sensed movement.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium.

For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. An apparatus configured to process video data, the apparatus comprising:
   a memory configured to store the video data;
   one or more processors configured to encode a portion of the stored video data in a pixel domain to generate pixel domain video data, wherein the pixel domain video data comprises a plurality of tiles each having a portion of 360 video image;
   a first graphics processing unit configured to process the video data in a graphics domain to generate graphics domain video data, wherein the graphics domain video data comprises a texture having an entirety of the 360 video image; and
   an interface to transmit the graphics domain video data including the texture having the entirety of the 360 video image and a subset of the pixel domain video data including a subset of the plurality of tiles,
   wherein the one or more processors are further configured to stitch the video data together to form an equirectangular canvas, and wherein the first graphics processing unit is further configured to convert the equirectangular canvas to the texture and render the texture inside a sphere,
   wherein the first graphics processor is configured to transmit the texture via the interface at a first frame rate, and wherein the one or more processors are further configured to transmit the subset of the pixel domain video data via the interface at a second frame rate greater than the first frame rate, and
   wherein the first graphics processor is configured to transmit the texture via the interface at a first resolution and wherein the one or more processors are further configured to transmit the subset of the pixel domain video data via the interface at a second resolution greater than the first resolution.

2. The apparatus of claim 1, wherein the one or more processors are configured to map the equirectangular canvas to one of a cube map or a pyramid projection, and encode the plurality of tiles at a plurality of resolutions, and wherein the subset of the plurality of tiles are within a field of view of a user.

3. The apparatus of claim 2, wherein the one or more processors are configured to determine movement adaptations of the user and to determine the field of view based on the determined movement adaptations of the user.

4. The apparatus of claim 2, wherein the one or more processors are configured to determine movement adaptations of the user, determine the field of view based on the determined movement adaptations of the user, and adapt surround sound video based on the determined field of view.

5. The apparatus of claim 3, wherein the one or more processors are configured to transmit tiles of the subset of tiles in a center of the field of view at a third resolution based on the movement adaptations and transmit tiles of the subset of tiles within the field of view, but not in the center of the field of view, at a fourth resolution less than the third resolution.

6. An apparatus configured to process video data, the apparatus comprising:
   a memory configured to store a video stream comprising pixel domain video data and graphics domain video data;
   one or more processors configured to parse the stored video stream into a graphics stream and an audio-video stream and decode the parsed video stream, wherein the decoded video stream includes pixel domain data comprising a plurality of tiles each having a portion of 360 video image, and wherein the plurality of tiles together include less than an entirety of the 360 video image;
   a sensor to sense movement adaptations of a user; and
   a graphics processing unit configured to generate a canvas on a spherical surface with texture information from the graphics stream, and render a field of view based on the sensed movement adaptations of the user, wherein the texture information includes the entirety of the 360 video image,
   wherein the texture information in the graphics stream is present in the graphics stream at a first frame rate, and the pixel domain data is present in the decoded video stream at a second frame rate greater than the first frame rate, and
   wherein the texture information is at a first resolution and the pixel domain data is at a second resolution greater than the first resolution.

7. The apparatus of claim 6, wherein the one or more processors are configured to decode the plurality of tiles that are within the field of view of the user, upsample both tiles of the plurality of tiles that are low resolution tiles and tiles of the plurality of tiles that are high resolution tiles, and combine the low resolution tiles and the high resolution tiles to form a single image overlay.

8. The apparatus of claim 7, wherein the one or more processors are configured to form the single image overlay based on the sensed movement adaptations of the user.

9. The apparatus of claim 8, wherein the one or more processors are configured to not form the single image overlay based on determining that the sensed movement adaptations of the user causes the upsampled tiles to be outside the field of view.

10. The apparatus of claim 9, wherein the sensed movement adaptations of the user comprises head movement trajectories.

11. The apparatus of claim 9, wherein the one or more processors are configured to compare an extent of head movement of the user to a window of visibility.

12. A method of processing video data, comprising:
storing the video data;
encoding a portion of the video data in a pixel domain to generate pixel domain video data, wherein the pixel domain video data comprises a plurality of tiles each having a portion of 360 video image;
processing the video data in a graphics domain to generate graphics domain video data, wherein the graphics domain video data comprises a texture having an entirety of the 360 video image;
stitching the video data together to form an equirectangular canvas;
converting the equirectangular canvas to the texture;
rendering the texture inside a sphere; and
transmitting the graphics domain video data including the texture having the entirety of the 360 video image and a subset of the pixel domain video data including a subset of the plurality of tiles, wherein transmitting comprises:
transmitting the texture at a first frame rate and a first resolution; and
transmitting the subset of the pixel domain video data at a second frame rate greater than the first frame rate and at a second resolution greater than the first resolution.

13. The method of claim 12, further comprising:
mapping the equirectangular canvas to one of a cube map or a pyramid projection; and
encoding the plurality of tiles at a plurality of resolutions, wherein the subset of the plurality of tiles are within a field of view of a user.

14. The method of claim 13, further comprising:
determining movement adaptations of the user; and
determining the field of view based on the determined movement adaptations of the user.

15. The method of claim 13, further comprising:
determining movement adaptations of the user;
determining the field of view based on the determined movement adaptations of the user; and
adapting surround sound video based on the determined field of view.

16. The method of claim 14, further comprising:
transmitting tiles of the subset of tiles in a center of the field of view at a third resolution based on the determined movement adaptations; and
transmitting tiles of the subset of tiles within the field of view, but not in the center of the field of view, at a fourth resolution less than the first resolution.

17. The method of claim 12, further comprising:
decoding the video data and parsing the video data into a graphics stream and an audio-video stream;
sensing movement adaptations of a user;
generating a canvas on a spherical surface with texture information received from the graphics stream; and
rendering a field of view based on the sensed movement adaptations of the user.

18. A method of processing a video data, comprising:
storing a video stream comprising pixel domain video data and graphics domain video data;
parsing the stored video stream into a graphics stream and an audio-video stream and decoding the video stream, wherein the decoded video stream includes pixel domain data comprising a plurality of tiles each having a portion of 360 video image, and wherein the plurality of tiles together include less than an entirety of the 360 video image;
sensing movement adaptations of a user;
generating a canvas on a spherical surface with texture information from the graphics stream, wherein the texture information includes the entirety of the 360 video image; and
rendering a field of view based on the sensed movement adaptations of the user,
wherein the texture information in the graphics stream is present in the graphics stream at a first frame rate, and the pixel domain data is present in the decoded video stream at a second frame rate greater than the first frame rate, and
wherein the texture information is at a first resolution and the pixel domain data is at a second resolution greater than the first resolution.

19. The method of claim 18, further comprising:
decoding the plurality of tiles that are within the field of view of the user;
upsampling both tiles of the plurality of tiles that are low resolution tiles and tiles of the plurality of tiles that are high resolution tiles; and
combining the low resolution tiles and the high resolution tiles to form a single image overlay.

20. The method of claim 19, further comprising forming the single image overlay based on the sensed movement adaptations of the user.

21. The method of claim 20, further comprising not forming the single image overlay based on determining that the sensed movement adaptations of the user cause the upsampled tiles to be outside the field of view.

22. The method of claim 21, wherein the sensed movement adaptations of the user comprise head movement trajectories.

23. The method of claim 21, further comprising comparing an extent of head movement of the user to a window of visibility.

* * * * *